April 25, 1967  H. P. ECLOV  3,315,857
BAG CARRIER
Filed April 6, 1965  2 Sheets-Sheet 1
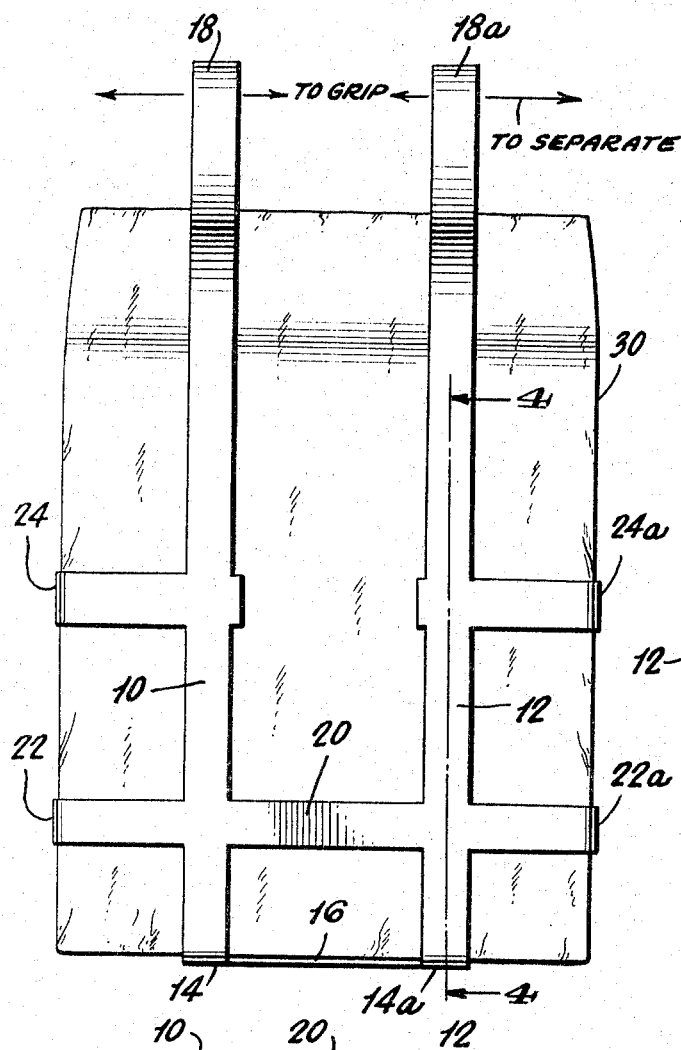
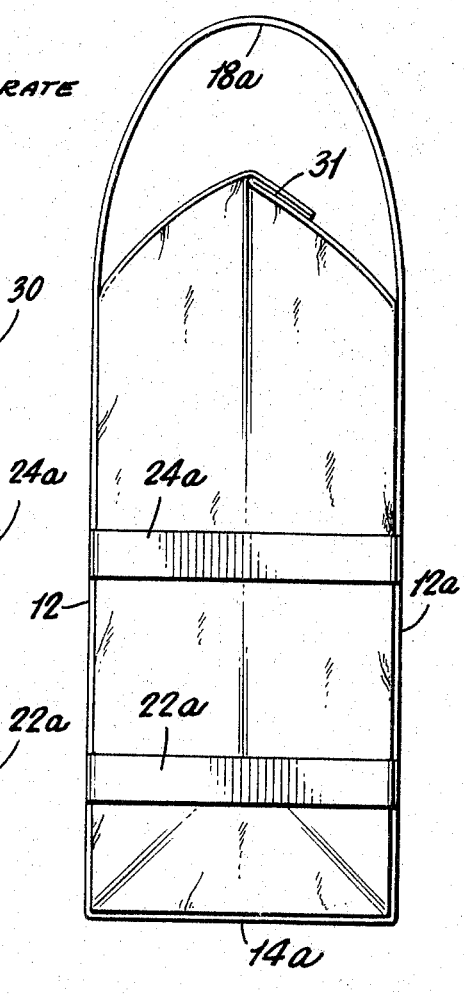
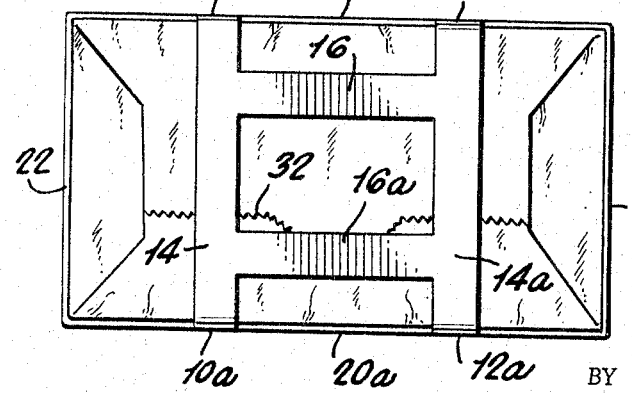
INVENTOR
HJALMAR P. ECLOV
BY Charles L. Sturtevant
ATTORNEY April 25, 1967 H. P. ECLOV 3,315,857
BAG CARRIER
Filed April 6, 1965 2 Sheets-Sheet 2
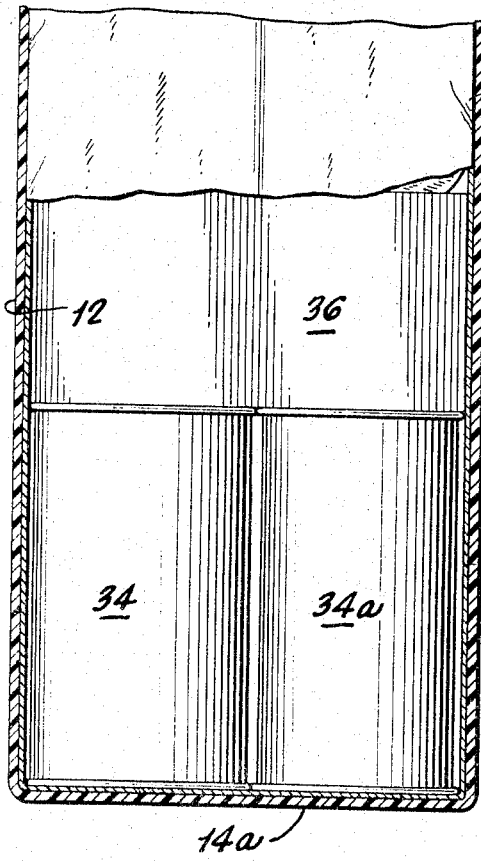
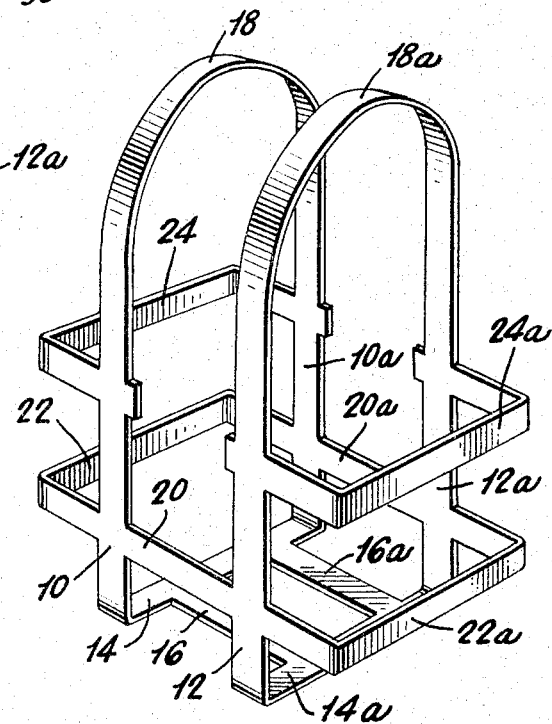
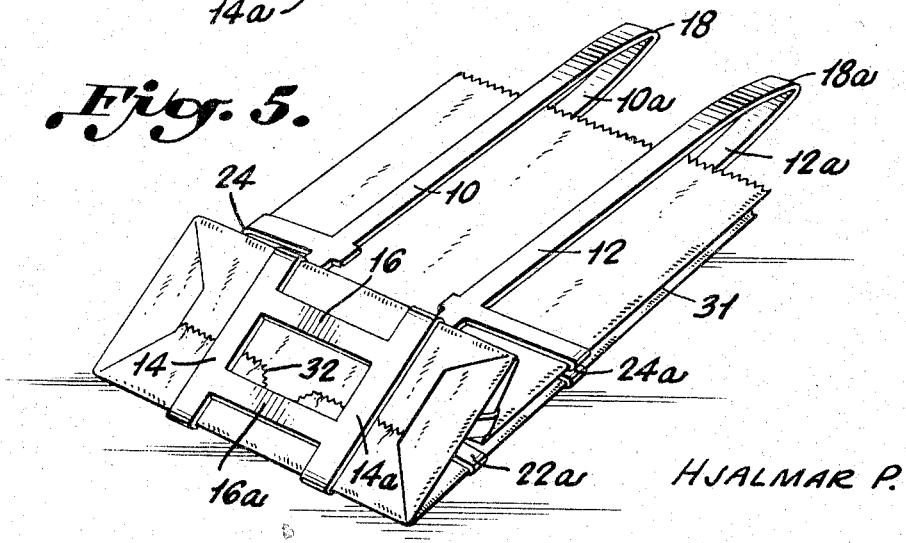
INVENTOR
HJALMAR P. ECLOV
BY
ATTORNEY

United States Patent Office 3,315,857
Patented Apr. 25, 1967

3,315,857
BAG CARRIER
Hjalmar P. Eclov, 519 S. Veitch St.,
Arlington, Va. 22204
Filed Apr. 6, 1965, Ser. No. 445,875
5 Claims. (Cl. 224—45)

The present invention relates to new and useful improvements in carrier devices, and more particularly to such improvements in a carrier and reinforcement for shopping bags and the like.

The carrier is in the form of a flexible skeleton frame formed of suitable strip material. The material is preferably a suitable plastic material having the desired strength and flexibility. However, the strip may be formed of other materials such as paper of suitable strength or laminated strips of paper. The frame includes horizontal, vertical and bottom strap sections within which a shopping bag may be assembled. The vertical strap sections are joined to overlie the top of the bag and provide accessible carrying handles. To facilitate assembly of the bag with the carrier, certain upper horizontal strap sections may be divided to permit relative lateral separation of adjacent frame portions when inserting a bag therein. Grasping of the handles to carrying position restores the frame portions to bag confining and reinforcing position.

When shopping, as for groceries, a large order is often placed in plural telescoped bags to provide multiple thicknesses for the necessary strength and resistance to breakage under a relatively heavy load. It is an object of the present invention to provide a carrier which reinforces the shopping bag so that a single bag may be employed even with such relatively heavy loads.

Another object of the invention is to provide a carrier wherein upper portions of the frame may be relatively separated to facilitate assembly of a shopping bag therewith.

A further object of the invention is to provide a flexible carrier which may be collapsed and folded into a compact space and one which may also be preassembled with a shopping bag and similarly folded into a compact assembly.

The above and other objects of this invention will in part be obvious and will be hereinafter more fully pointed out.

In the drawings:

FIG. 1 is a side elevation of the reinforcing carrier and shopping bag assembly;

FIG. 2 is an end view of FIG. 1;

FIG. 3 is a bottom view of FIG. 1;

FIG. 4 is an enlarged fragmentary section taken along the line 4—4 of FIG. 1;

FIG. 5 is a perspective view showing the carrier and the bag in a collapsed and partially folded position; and FIG. 6 is a perspective view showing the carrier alone.

Referring to the accompanying drawings and particularly to FIG. 6 showing the carrier alone but in operative position, the skeleton frame includes vertically extending strips 10, 10a, 12, 12a which are joined at their bottoms by transverse strips 14, 14a. These transverse strips 14, 14a are in turn joined by strips 16, 16a extending at right angles thereto. The tops of the vertical strips 10, 10a and 12, 12a are joined together by portions 18, 18a, respectively, which together form a carrying handle. Close to the bottom of the vertical strips, there is shown a peripherally continuous and generally horizontal bag embracing strip having longitudinal legs 20, 20a and end portions 22, 22a. The number of such peripherally continuous strips may be increased as desired in consideration of the required strength and size of the bag. Upwardly of the horizontal strips, there are provided one or more sets of peripherally discontinuous and generally horizontal strips 24, 24a to embrace the respective outer surfaces of the included bag. It is to be noted that these strips do not join the adjacent portions of the vertical strips. Permissive lateral separation of at least upper portions of the flexible vertical strips is disposed to facilitate insertion or removal of a filled or empty bag. This may be accomplished by locating an uppermost horizontal strip well below the handle portions 18, 18a and the top of an included bag; or the uppermost horizontal strip may be divided to provide the pair of such strips 24, 24a, as will be described below.

It is to be noted that the vertical strips 10, 10a and 12, 12a are not inwardly connected by the strips 24, 24a. This permits strips 24, 24a to be positioned higher around the bag and the vertical strips above the strips 22, 22a to be separated by grasping the handle portions 18, 18a, as indicated in FIG. 1, to facilitate insertion of a bag within the skeleton frame or removal of a bag therefrom. After the bag is inserted and filled, grasping of the handle portions 18, 18a will pull the same together, as indicated in FIG. 1, and thus restore the strips 24, 24a to their bag-confining and reinforcing positions.

Referring to FIGS. 1, 2 and 3, a bag 30 is shown positioned within the skeleton frame with the transverse portions of the strips 24, 24a and 22, 22a confining the respective opposite ends of the bag. The bottom of the bag includes a seam 32, and this seam is reinforced by the transverse bottom strip portions 14, 14a and the right angled strip portions 16, 16a. Thus, the bottom of the bag is effectively reinforced to carry a relatively heavy load.

As shown in FIG. 4, the bag is illustrated as being filled with goods, such as cans 34, 34a, and other goods 36 stacked thereon. When the bag is filled and closed by the folded-over portion 31, it will be noted that the handle portions 18, 18a of the vertical strips extend thereabove to form accessible carrying handles. Grasping of the handles for carrying serves to hold the strips 24, 24a in bag-confining positions.

For storage purposes, the frame itself may be folded either alone or with an included bag as shown in FIG. 5. Thus, the bottom of the bag is folded with the strips 14, 14a, 16, 16a with corresponding creasing of the vertical strips 10, 12. Likewise, the transverse portions of the horizontal strips 24, 24a, 22, 22a are centrally folded inwardly to lie between the complementally folded end portions of the bag.

From the above description, it will be seen that the present invention provides an efficient and extremely inexpensive skeleton type carrier for flexible bags. The arrangement of the horizontal and the vertical strips is such as to effectively reinforce an included bag both across the bottom and around the upstanding periphery thereof. Even with relatively heavy loads, a single thickness of bag may be employed with the reinforcing carrier. The carrier may be collapsed either alone or with an included bag for storage purposes. In addition to its usefulness as a shopping bag carrier, the carrier may also be sold separately in collapsed position for use in the home. For example, the carrier may be associated with trash or garbage bags when empty so that when filled, the assembly can be conveniently carried for disposal thereof and the carrier can be discarded with such bags.

While one form of the invention has been shown for purposes of illustration, it is to be clearly understood that various changes in detail and arrangement may be made without departing from the spirit and scope of the invention as set forth in the appended claims.

I claim:

1. A flexible bag carrier in the form of a skeleton frame of flexible material capable of being folded to collapsed storage position, and comprising a plurality of laterally spaced vertical strips providing handle means at the upper ends thereof and having transversely extending lower ends for bag support, and a plurality of generally horizontal disposed strips vertically spaced apart and connecting said vertical strips below the handle means, an uppermost horizontal strip being disconnected between said vertical strips to permit lateral separation of the vertical strips and the uppermost horizontal strip for insertion and removal of a bag but with the uppermost horizontal strip maintained in bag-confining position by the vertical strips when grasping together the handle means for carrying purposes.

2. In combination with a flexible bag carrier as claimed in claim 1, the provision of a flexible bag inserted within the skeleton frame with the bottom juxtaposed with the transversely extending lower ends of the vertical strips and with the sides confined by the vertical and horizontal strips.

3. A flexible bag carrier in the form of a skeleton frame of flexible material capable of being folded to collapsed storage position, and comprising a pair of laterally spaced and continuous vertical strips with the upper ends thereof providing handle means and having transversely extending lower ends to support the bottom of a bag, at least one continuous horizontally disposed strip connecting said vertical strips and disposed adjacent the lower extremities of the said vertical strips, and at least one pair of upper horizontally disposed strips with one strip of each said pair connecting a corresponding vertical strip outwardly of the space between the said vertical strips permitting separation of the handle means and the pair of horizontal strips for insertion and removal of a bag.

4. A flexible bag carrier as claimed in claim 3, wherein there are provided cross strips connecting the transversely extending lower ends of the vertical strips to provide therewith additional bag support.

5. In combination with a flexible bag carrier as claimed in claim 3, the provision of a flexible bag inserted within the skeleton frame with the bottom juxtaposed with the transversely extending lower ends of the vertical strips and with the sides confined by the vertical and horizontal strips.

References Cited by the Examiner

UNITED STATES PATENTS

| | | |
|---|---|---|
| 935,364 | 9/1909 | Gillespie. |
| 1,088,939 | 3/1914 | Snee. |
| 1,847,501 | 3/1932 | Stahler _____ 224—55 X |
| 2,464,069 | 3/1949 | Benson _____ 224—45 |
| 3,151,792 | 10/1964 | Garland _____ 224—45 |

FOREIGN PATENTS

| | | |
|---|---|---|
| 555,031 | 3/1958 | Canada. |
| 214,037 | 4/1924 | Great Britain. |

GERALD M. FORLENZA, *Primary Examiner.*

F. E. WERNER, *Assistant Examiner.*